US005759665A

United States Patent [19]

Lafond

[11] Patent Number: 5,759,665

[45] Date of Patent: Jun. 2, 1998

[54] INSULATED ASSEMBLY INCORPORATING A THERMOPLASTIC BARRIER MEMBER

[76] Inventor: Luc Lafond, 23 Woodvalley Drive, Etobicoke, Ontario, Canada, M9A 4H4

[21] Appl. No.: 568,177

[22] Filed: Dec. 6, 1995

Related U.S. Application Data

[63] Continuation-in-part of Ser. No. 548,919, Oct. 26, 1995, which is a continuation-in-part of Ser. No. 513,180, Aug. 9, 1995, which is a continuation-in-part of Ser. No. 477,950, Jun. 7, 1995, Pat. No. 5,616,415, which is a continuation-in-part of Ser. No. 871,016, Apr. 20, 1992, Pat. No. 5,441,779.

[30] Foreign Application Priority Data

Apr. 22, 1991 [CA] Canada .................................. 2040636

[51] Int. Cl.$^6$ ........................................................ B32B 3/04

[52] U.S. Cl. ........................... 428/122; 428/156; 428/913

[58] Field of Search ..................................... 428/122, 156, 428/913

[56] References Cited

U.S. PATENT DOCUMENTS

| | | | |
|---|---|---|---|
| 4,831,799 | 5/1989 | Glover et al. | 52/172 |
| 4,950,344 | 8/1990 | Glover et al. | 156/109 |
| 5,120,584 | 6/1992 | Ohlenforst et al. | 428/34 |
| 5,441,779 | 8/1995 | Lafond | 428/34 |

FOREIGN PATENT DOCUMENTS

| | | |
|---|---|---|
| 1268613 | 6/1990 | France . |

*Primary Examiner*—Helen Lee
*Attorney, Agent, or Firm*—Paul Sharpe, McFadden, Fincham

[57] ABSTRACT

An insulating spacer for use in glazing assemblies is provided. The spacer comprises a foamed insulating body and further includes a second sealant material. The insulating body partially contacts the substrates as does the sealant to provide a double seal when used in a glazing assembly. In other embodiments the spacer is a composite of foam, sealant material, rigid plastics and desiccated matrices. A further embodiment discloses an undulating foam spacer body for easy manipulation about the corner in glazing assemblies. The result of incorporation of the foam is a substantially energy efficient spacer and assembly.

21 Claims, 3 Drawing Sheets

INSULATED ASSEMBLY INCORPORATING A THERMOPLASTIC BARRIER MEMBER

This application is a continuation-in-part application of U.S. patent application 08/548,919, filed Oct. 26, 1995, allowed which is a continuation-in-part application of U.S. Ser. No. 08/513,180, filed Aug. 9, 1995, which is a continuation-in-part application of U.S. Ser. No. 08/477,950, filed Jun. 7, 1995, now U.S. Pat. No. 5,616,415 which, in turn, is a continuation-in-part application of U.S. Ser. No. 871,016, filed Apr. 20, 1992, now U.S. Pat. No. 5,441,779 issued Aug. 15, 1995.

FIELD OF THE INVENTION

This invention relates to a composite spacer for use in an insulated substrate assembly and further relates to an insulated glass assembly incorporating such a spacer.

BACKGROUND OF THE INVENTION

Insulated assemblies presently known in the art incorporate the use of various polymeric substances in combination with other materials. One such assembly includes a butylated polymer in which there is embedded an undulating metal spacer. Although useful, this type of sealant strip is limited in that the metal spacer, over time, becomes exposed to the substrates which results in a drastic depreciation in the efficiency of the strip. The particular difficulty arises with moisture vapour transmission when the spacer becomes exposed and contacts the substrates.

Further, many of the butylated polymers currently used in insulated glass assemblies are impregnated with a desiccant. This results in a further problem, namely decreased adhesiveness of the butylated sealant.

Glover, et al. in U.S. Pat. No. 4,950,344, provide a spacer assembly including a foam body separated by a vapour barrier and further including a sealant means about the periphery of the assembly. Although this arrangement is particularly efficient from an energy point of view, one of the key limitations is that the assembly must be fabricated in a number of steps. Generally speaking, the sealant must be gunned about the periphery in a subsequent step to the initial placement of the spacer. This has ramifications during the manufacturing phase and is directly related to increased production costs and, therefore, increased costs in the assembly itself.

One of the primary weaknesses in existing spacer bodies and spacer assemblies relates to the transmission of energy through the spacer. Typically, in existing arrangements the path of heat energy flow through the spacer is simplified as opposed to torturous and in the case of the former, the result is easy transmission of energy from one substrate to the other via the spacer. In the prior art, this difficulty is compounded by the fact that materials are employed which have a strong propensity to conduct thermal energy.

It has been found particularly advantageous to incorporate, as a major component of the spacer, a soft or reasonably soft, resilient insulated body, of a cellular material having low thermal conductivity. Examples of materials found to be useful include natural and synthetic elastomers (rubber), cork, EPDM, silicones, polyurethanes and foamed polysilicones, urethanes and other suitable foamed materials. Significant benefits arise from the choice of these materials since not only are they excellent insulators from an energy point of view but additionally, depending on the materials used, the entire spacer can maintain a certain degree of resiliency. This is important where windows, for example, engaged with such a strip experience fluctuating pressure forces as well as a thermal contraction and expansion. By making use of a resilient body, these stresses are alleviated and accordingly, the stress is not transferred to the substrates as would be the case, for example, in assemblies incorporating rigid spacers.

Where the insulating body is composed of a foam material, the foam body may be manufactured from thermoplastic or thermosetting plastics. Suitable examples of the thermosets include silicone and polyurethane. In terms of the thermoplastics, examples include silicone foam or elastomers, one example of the latter being, SANTOPRENE™. Advantages ascribable to the aforementioned compounds include, in addition to what has been included above, high durability, minimal outgassing, low compression, high resiliency and temperature stability, inter alia.

Of particular use are the silicone and the polyurethane foams. These types of materials offer high strength and provide significant structural integrity to the assembly. The foam material is particularly convenient for use in insulating glazing or glass assemblies since a high volume of air can be incorporated into the material without sacrificing any structural integrity of the body. This is convenient since air is known to be a good insulator and when the use of foam is combined with a material having a low thermal conductivity together with the additional features of the spacer to be set forth hereinafter, a highly efficient composite spacer results. In addition, foam is not susceptible to contraction or expansion in situations where temperature fluctuations occur. This clearly is beneficial for maintaining a long-term uncompromised seal in an insulated substrate assembly. The insulating body may be selected from a host of suitable materials as set forth herein and in addition, it will be understood that suitable materials having naturally occurring interstices or materials synthetically created having the interstices would provide utility.

It would be desirable to have a composite spacer which overcomes the limitations of previously employed desiccated butyl and further which overcomes the energy limitations now provided by spacers in the art. The present invention is directed to satisfying the limitations.

SUMMARY OF THE INVENTION

One object of the present invention is to provide an improved spacer for use in insulated substrate or glass assemblies.

A further object of the present invention is to provide a spacer for spacing substrates in an insulated assembly comprising a cellular insulating body having a front face and rear face in spaced relation, a first substrate engaging surface in spaced relation with a second substrate engaging surface; and at least one channel extending within the body and through the front face, at least one channel extending between substrate engaging surfaces.

Another object of the present invention, is to provide an insulated glass assembly having an interior atmosphere, comprising a pair of glass substrates; a cellular insulating body having spaced apart substrate engaging surfaces, a glass substrate engaged with a respective substrate engaging surface, the insulating body further including a front face directed toward the interior atmosphere of the assembly and a rear face extending outwardly of the interior assembly; and at least one channel extending within the body and through the front face, at least one channel extending between the substrate engaging surfaces.

A still further object of the present invention is to provide a composite spacer for spacing substrates in an insulated assembly comprising a first body of cellular insulating material having a front face and a rear face in spaced relation, a first substrate engaging surface in spaced relation with a second substrate engaging surface; at least one channel extending within the body and through the front face, at least one channel extending between substrate engaging surfaces; a vapour barrier contacting the rear face of the first body of cellular insulating material and a second body of cellular insulating material contacting the vapour barrier, wherein the cellular insulating bodies and the vapour barrier collectively provide at least three independent substrate engaging surfaces for engagement with a respective substrate.

As an attendant advantage, it has been found that the desiccated matrix, the insulating body and the sealant material may be simultaneously extruded in a one-piece integral spacer depending upon the type of material chosen for the insulating body. This is useful in that it prevents subsequent downstream processing related to filling or gunning sealant material in a glazing unit and other such steps. In this manner, the spacer, once extruded can be immediately employed in a glazing unit.

As will be appreciated by those skilled in the art, in the assembly polyisobutylene (PIB), butyl or other suitable sealant or butylated material may extend about the periphery of the assembly and therefore provide a further sealed surface. Sealing or other adhesion for the insulating body may be achieved by providing special adhesives, e.g. acrylic adhesives, pressure sensitive adhesives, hot melt inter alia. Further, the insulating body may comprise, at least in the area of the substrate engaging surfaces, uncured material so that on application of heat, the body is capable of direct adhesion to the substrate. In an embodiment such as this, the body of insulating material would be composed of, for example, ultra-violet curable material.

One of the primary advantages to providing a cellular body having at least one channel therein can be realized from consideration of energy transmission. Generally, as is known in the art, the more torturous the path from one side of the spacer to the other between substrates, the greater the dissipation of transmission of energy from one side to the other. To this end, it has been found that in a channel arrangement having a variety of profiles the path is such that energy transmission is kept to an absolute minimum. When this feature is combined with high quality sealants and multiple sealing surfaces provided for with the present invention, the result is a high quality, high thermally efficiency spacer.

To further augment the performance of the spacer, there may be included at least one projection within the channel to further increase the complexity of the energy transmission path. In one embodiment of the present invention, the path may be wave-like or include several "finger" projections. As a further attendant feature, desiccated matrix will be configured to conform and cooperate with the profile of the channel. Numerous advantages can be realized from this addition, namely: by providing desiccated matrix in the same shape, structural integrity is added to the spacer which therefore permits a higher volume of cellular material to be incorporated into the strip or spacer; the difference in density of the desiccated matrix relative to the foam body further reduces the transmission of energy through the spacer from one side to the other; and the hygroscopic properties of the desiccant material assists in maintaining an arid atmosphere between the substrates. Suitable desiccant materials are well known in the art and may include, as an example, zeolite beads, silica gel, calcium chloride, potassium chloride, inter alia, all of which may be matrixed within a semi-permeable flexible material such as a polysilicone or other suitable semi-permeable substance.

Having thus generally described the invention, reference will now be made to the accompanying drawings illustrating preferred embodiments.

BRIEF DESCRIPTION OF THE DRAWINGS

Similar numerals in the drawings denote similar elements.

DETAILED DESCRIPTION OF THE PREFERRED EMBODIMENTS

Figure 1:
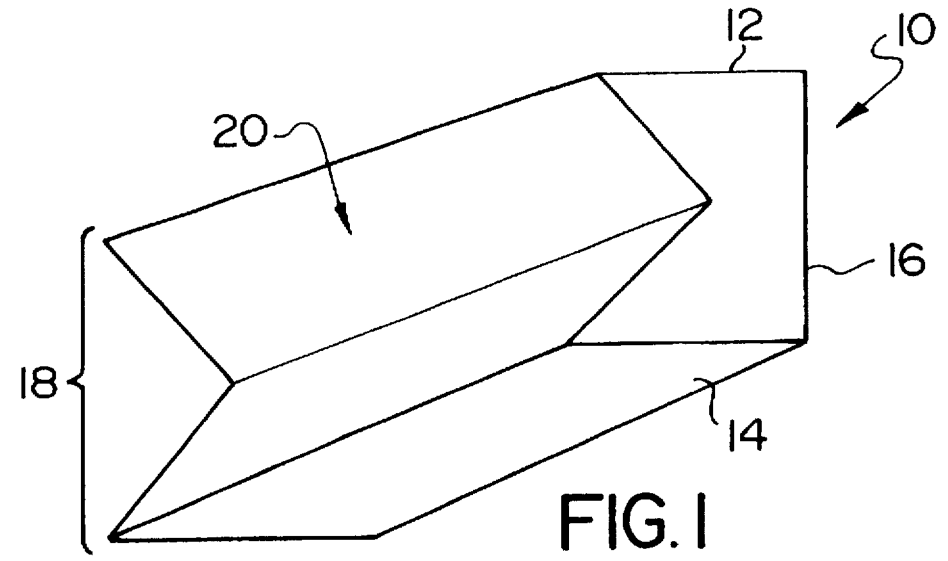
FIG. 1 is a perspective view of one embodiment of the present invention.

Referring now to FIG. 1, shown is one embodiment of the present invention in which numeral 10 globally denotes the spacer. In the embodiment shown, the spacer includes a pair of substrate engaging surfaces 12 and 14 in spaced relation and each adapted to receive a substrate (not shown). The spacer body includes a rear face 16 and a front face 18, the front face 18 having a channel 20 extending within face 18 and into spacer body 10. In the embodiment shown, the channel 20 comprises a generally arrow-head configuration. Regarding the spacer body 10, the same will be preferably composed of a cellular material which may be synthetic or naturally occurring. In the instance, where the cellular material is composed of naturally occurring material, cork and sponge may be suitable examples and in the synthetic version, suitable polymers including, but not limited to polyvinyl chlorides, polysilicone, polyurethane, polystyrene among others are suitable examples. Cellular material is desirable since such materials, while providing structural integrity additionally provide a high degree of interstices or voids between the material. In this manner, a high volume of air is included in the structure and when this is combined with an overall insulating material, the air voids augment the effectiveness of the insulation.

Figure 2:
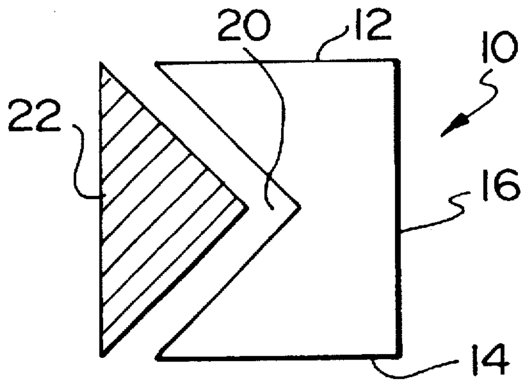
FIG. 2 is a side elevational view of FIG. 1 showing an exploded form with a desiccant matrix.

Referring now to FIG. 2, shown is an exploded side view of the spacer 10 in which a desiccated matrix 22 is provided. The matrix 22 is configured to correspond in shape to the channel 20 and may be adhered therein or coextruded with body 10. Desiccated matrices are well known in the art and suitable desiccant materials include zeolite beads, calcium chloride, potassium chloride, silica gel among others matrixed within a semi-permeable material such as polysilicones etc.

In the embodiment shown in FIG. 2, the spacer 10 may be positioned between substrates (not shown) by contacting substrate engaging surfaces 12 and 14 with a respective substrate (not shown). To this end, surfaces 12 and 14 may include suitable adhesives including acrylic adhesives, pressure sensitive adhesives, hot melt, polyisobutylene or other suitable butyl materials known to have utility for bonding such surfaces together. Rear face 16 would, in an assembly, be directed to the exterior of the assembly and accordingly, rear face 16 may include some form of a final peripheral sealant such as hot melt as an example.

Figure 3:
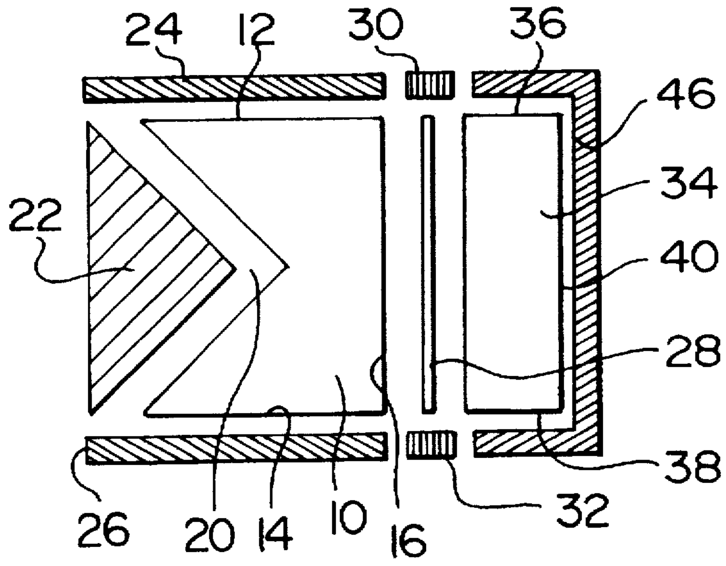
FIG. 3 is an exploded view of an alternate embodiment of the spacer.

Referring now to FIG. 3, shown is an alternate embodiment of the spacer. In the embodiment shown, substrate engaging surfaces 12 and 14 are augmented with an adhesive, the adhesive layers denoted by numerals 24 and 26, respectively. Suitable examples for the adhesives have been set forth herein previously with respect to FIG. 2. As an additional feature in the embodiment shown in FIG. 3, the same includes a vapour barrier 28 which may comprise any of the suitable materials for this purpose examples of which include the polyester films, polyvinylfluoride films, etc. In addition, the vapour barrier 28 may be metallized. A useful example to this end is metallized Mylar™ film. In order to further enhance the effectiveness of the arrangement, independent sealing surfaces different from the surfaces provided for by adhesive 24 and 26 are provided on vapour barrier 28. To this end, polyisobutylene may be positioned on the substrate contacting surfaces of the Mylar™, the PIB being denoted by numerals 30 and 32.

Figure 4:
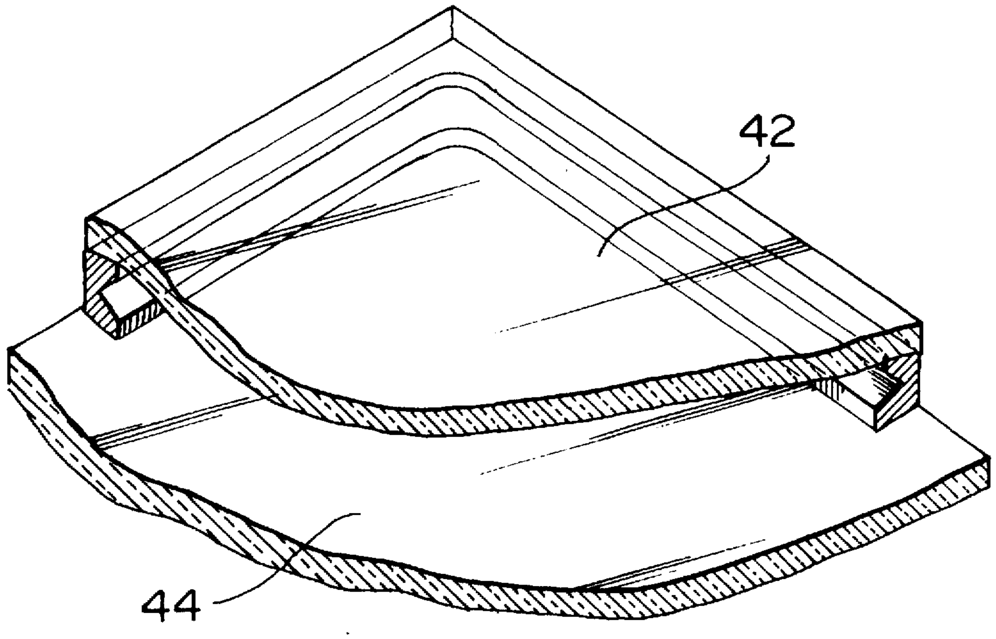
FIG. 4 is a perspective view of the spacer in situ between substrates.

Engaged with vapour barrier 28, there is further included a second cellular insulating body, broadly denoted by numeral 34 which may comprise a similar material to first insulating body or may be a completely different cellular material selected from the natural or synthetic cellular material as discussed herein previously. Body 34 includes substrate engaging surfaces 36 and 38 and a rear face 40. Rear face 40 and more particularly, second insulating body 34, when in position between substrates 42 and 44 as illustrated in FIG. 4, is directed to the exterior or outside perimeter of the insulated assembly as opposed to being directed towards the interior atmosphere contained between the substrates. As such, a further sealant which may be in the form of a C-shaped sealant denoted by numeral 46 may surround the body 34 to complete the spacer assembly. A suitable material for this purpose would, include any of the known suitable materials one example of which is hot melt.

Figure 5A:
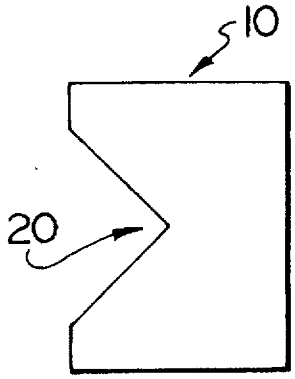
FIGS. 5A through 5I illustrate alternate embodiments of the spacer.
Figure 5B:
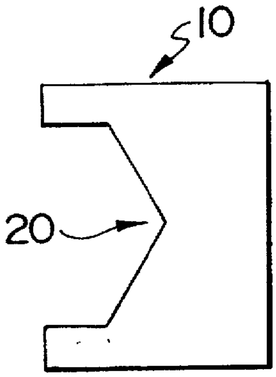
Figure 5C:
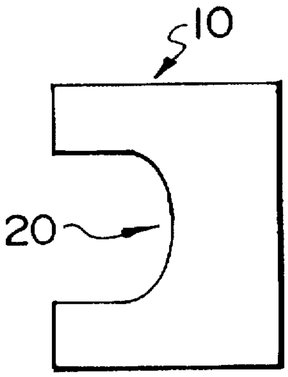
Figure 5D:
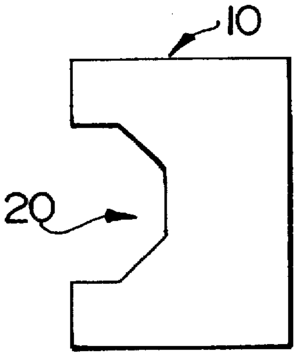
Figure 5E:
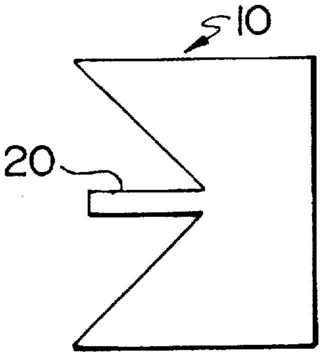
Figure 5F:
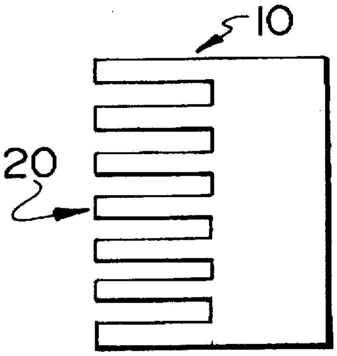
Figure 5G:
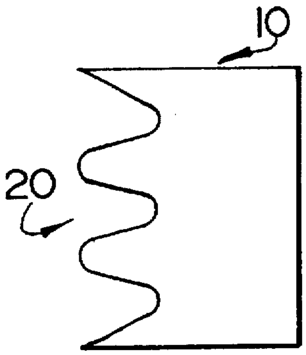
Figure 5H:
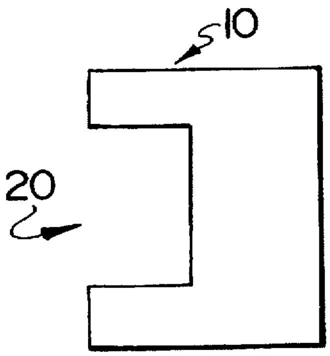
Figure 5I:
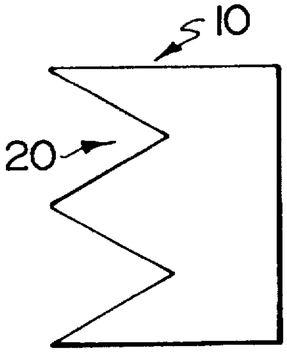

Referring now to FIGS. 5A through 5I, shown are further embodiments of the spacer as illustrated in FIG. 1. In particular, FIG. 5A illustrates a truncated arrow channel, FIG. 5B illustrates a squared arrow-head shape. FIG. 5C provides a rounded interior surface on an otherwise rectangular channel. FIG. 5D provides a polygonal interior channel. FIG. 5E introduces a channel similar to FIG. 1 having a projection therein. FIG. 5F provides a further variation on the injection illustrated in FIG. 5E, FIG. 5G illustrates a generally wave-like or undulating profile. FIG. 5H illustrates a rectangular channel, while FIG. 5I provides a pointed waveform channel. Other channel profiles will be appreciated by those skilled in the art.

It will be understood that the cellular material selections may vary and that the first and/or second insulating materials may comprise mixtures of cellular materials to further enhance the insulating capacity of the strip.

By the selection of appropriate materials together with the provision of the channel arrangement, resiliency can be maintained for the spacer assembly set forth herein. This is particularly advantageous since where resiliency cannot be maintained between substrates, when the substrates are subjected to contraction or expansion or wind-pressure fluctuations as would be experienced in high-rise applications, the entire assembly can yield without disrupting the contact of the surfaces and the substrates.

As those skilled in the art will realize, these preferred illustrated details can be subjected to substantial variation, without affecting the function of the illustrated embodiments. Although embodiments of the invention have been described above, it is not limited thereto and it will be apparent to those skilled in the art that numerous modification form part of the present invention insofar as they do not depart from the spirit, nature and scope of the claimed and described invention.

I claim:

1. A spacer for spacing substrates in an insulated assembly comprising:

a cellular insulating body having a front face and rear face in spaced relation, a first substrate engaging surface in spaced relation with a second substrate engaging surface;

at least one channel extending within said body and through said front face, said at least one channel extending between substrate engaging surfaces and substantially the width of said front face, said channel having a profile different from a profile of said rear face; and a desiccated matrix having a shape corresponding to said channel and positioned therein.

2. The spacer as defined in claim 1, wherein said cellular insulating body comprises a consolidated insulating material having interstices.

3. The spacer as defined in claim 2, wherein said insulating material comprises cork.

4. The spacer as defined in claim 2, wherein said insulating material comprises EPDM.

5. The spacer as defined in claim 2, wherein said insulating material comprises foam material.

6. The spacer as defined in claim 2, wherein said foam material includes a single material.

7. The spacer as defined in claim 2, wherein said foam material comprises a multiple material foam.

8. The spacer as defined in claim 1, wherein said rear face includes a fluid barrier.

9. The spacer as defined in claim 8, wherein said fluid barrier comprises a vapour barrier.

10. The spacer as defined in claim 9, wherein said vapour barrier comprises a plastic material.

11. The spacer as defined in claim 10, wherein said plastic material comprises a metallized plastic material.

12. The spacer as defined in claim 1, wherein said channel includes a desiccant matrix therein.

13. The spacer as defined in claim 12, wherein said desiccant matrix is configured to cooperatively engage said channel.

14. The spacer as defined in claim 11, wherein said metallized vapour barrier further includes a layer of cellular insulating material.

15. The spacer as defined in claim 1, wherein said channel has a shape selected from the group comprising C-shaped, polygonal, wave, parabolic, and undulating forms.

16. The spacer as defined in claim 15, wherein said channel further includes at least one projection extending outwardly from said channel.

17. A composite spacer for spacing substrates in an insulated assembly comprising:

a first body of cellular insulating material having a front face and a rear face in spaced relation, a first substrate engaging surface in spaced relation with a second substrate engaging surface;

at least one channel extending within said body and through said front face, said at least one channel extending between substrate engaging surfaces and substantially the width of the front face; and a vapour barrier contacting said rear face of said first body of cellular insulating material and a second body of cellular insulating material contacting said vapour barrier, wherein said cellular insulating bodies and said vapour barrier collectively provide at least three independent substrate engaging surfaces for engagement with a respective substrate.

18. The spacer as defined in claim 17, wherein said composite spacer comprises a laminated composite spacer.

19. The spacer as defined in claim 17, wherein said first body of cellular insulating material and said second body of cellular insulating material comprise similar materials.

20. The spacer as defined in claim 17, wherein said first body of cellular insulating material and said second body of cellular insulating material comprise different materials.

21. The spacer as defined in claim 17, wherein said first body of cellular material and said second body of cellular material each comprise a mixture of foamed materials.

* * * * *